(12) United States Patent
Hirai et al.

(10) Patent No.: US 8,292,507 B2
(45) Date of Patent: Oct. 23, 2012

(54) BEARING DEVICE AND ROTARY MACHINE

(75) Inventors: Takamasa Hirai, Hiroshima (JP);
Sadamu Takahashi, Hiroshima (JP);
Kyoichi Ikeno, Hiroshima (JP);
Naoyuki Nagai, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 219 days.

(21) Appl. No.: 12/865,487

(22) PCT Filed: Feb. 4, 2009

(86) PCT No.: PCT/JP2009/051873
§ 371 (c)(1),
(2), (4) Date: Jul. 30, 2010

(87) PCT Pub. No.: WO2009/099094
PCT Pub. Date: Aug. 13, 2009

(65) Prior Publication Data
US 2011/0019950 A1    Jan. 27, 2011

(30) Foreign Application Priority Data
Feb. 4, 2008   (JP) .................................. 2008-024381

(51) Int. Cl.
*F16C 17/03* (2006.01)

(52) U.S. Cl. ........................................ 384/117; 384/312

(58) Field of Classification Search .................. 384/117, 384/309–312
See application file for complete search history.

(56) References Cited

U.S. PATENT DOCUMENTS
4,005,916 A * 2/1977 Dillon ............................ 384/117
6,050,727 A * 4/2000 Messmer et al. ................ 384/99

FOREIGN PATENT DOCUMENTS
| JP | 48-13316 | 4/1973 |
| JP | 52-118114 | 10/1977 |
| JP | 52-118150 | 10/1977 |

(Continued)

OTHER PUBLICATIONS

International Search Report issued Mar. 17, 2009 in International (PCT) Application No. PCT/JP2009/051873.

(Continued)

*Primary Examiner* — Thomas R Hannon
(74) *Attorney, Agent, or Firm* — Wenderoth, Lind & Ponack, L.L.P.

(57) ABSTRACT

The bearing device has a bearing housing which is supported by a bearing base mounted on a body of a rotary machine equipped with a rotating shaft and through which the rotating shaft penetrates at the center and a plurality of pads which are arranged inside the bearing housing so as to circumferentially surround the rotating shaft and rotatably support the rotating shaft. A contact surface between an outer circumference of the bearing housing and an inner circumference of the bearing base extends along the axial direction of the rotating shaft and forms a convex curved surface protruding outward, and the bearing housing is slidably supported by the bearing base via the contact surface of the convex curved surface. At least either the inner circumference of the bearing housing or the outer circumference of the pad forms a curved surface extending along the axial direction, and a distance between the inner circumference of the bearing housing and the outer circumference of the pad gradually increases from the center towards the ends along the axial direction.

10 Claims, 10 Drawing Sheets

FOREIGN PATENT DOCUMENTS

| | | |
|---|---|---|
| JP | 55-26134 | 2/1980 |
| JP | 62-118114 | 5/1987 |
| JP | 1-58824 | 4/1989 |
| JP | 5-42744 | 6/1993 |
| JP | 5-332355 | 12/1993 |
| JP | 6-10620 | 2/1994 |
| JP | 2000-46042 | 2/2000 |
| JP | 2001-132737 | 5/2001 |

OTHER PUBLICATIONS

Japanese Notice of Allowance issued Jul. 31, 2012 in corresponding Japanese Patent Application No. 2008-024381 with English translation.

\* cited by examiner

BEARING DEVICE AND ROTARY MACHINE

TECHNICAL FIELD

The present invention relates to a slide bearing device capable of reducing concentration of stress due to partial contact and a rotary machine equipped with the bearing device.

BACKGROUND ART

Conventionally, as bearing devices of this type, there is known a "pad journal bearing" disclosed in Patent Document 1 and a "tilting pad bearing" disclosed in Patent Document 2. Each of the bearing devices disclosed in these Patent Documents is provided with a bearing housing in which a rotating shaft acting as a supported body is mounted so as to penetrate at the center and a plurality of pads arranged around the rotating shaft inside the bearing housing. Further, in Patent Document 1, the plurality of pads which have been arranged around the rotating shaft are mounted in two sets so as to surround the rotating shaft along the axial direction.

[Patent Document 1] Japanese Published Unexamined Patent Application No. S62-118114
[Patent Document 2] Japanese Published Unexamined Utility Model Application No. H5-42744

DISCLOSURE OF THE INVENTION

Problems to be Solved by the Invention

Incidentally, in the bearing devices disclosed in the above-described Patent Documents, the rotating shaft which is a rotor is increased in its own weight with an increased size of a rotary machine and the rotating shaft may be deformed like an arch with respect to its axis line. Then, the above-described deformation of the rotating shaft will cause a phenomenon of partial contact that inner circumferences of the pads are not uniformly in contact with the circumference of the rotating shaft. Thereby, such a problem may arise in that excessive friction is imparted to the pads to increase the temperature. FIG. 10 schematically shows the phenomenon of partial contact. In FIG. 10, a rotating shaft 90 and pads 91 for supporting the rotating shaft 90 are disclosed. Further, where the above-described friction due to the partial contact of the pads occurs, a problem may also arise in that bearing characteristics are changed to lower the stability of shaft vibration.

On the other hand, in large-sized rotary machines such as a turbine and a compressor, used is a tilting pad bearing disclosed in Patent Document 2. In the tilting pad bearing, the back surface of a pad opposite the side in contact with a rotating shaft is formed so as to be curved outward. The back surface of the pad is curved, as described above, so as to follow the deformation of the rotating shaft. However, it is not sufficient to follow the deformation of the rotating shaft and it is not easy to stabilize the bearing characteristics.

The present invention has been made in view of the above-described circumstances, providing a bearing device which is capable of effectively responding to a phenomenon of partial contact due to inability of the inner circumferences of pads to be uniformly in contact with the circumference of the rotating shaft by a rotating shaft deformed like an arch with respect to its axis line and also capable of stabilizing bearing characteristics and a rotary machine equipped with the bearing device.

Means for Solving the Problems

In order to solve the above problems, a bearing device of the present invention is provided with a bearing housing which is supported by a bearing base mounted on a body of a rotary machine equipped with a rotating shaft and through which the rotating shaft penetrates at the center and a plurality of pads which are arranged inside the bearing housing so as to circumferentially surround the rotating shaft and rotatably support the rotating shaft. A contact surface between an outer circumference of the bearing housing and an inner circumference of the bearing base extends along the axial direction of the rotating shaft and forms a convex curved surface protruding outward. The bearing housing is slidably supported by the bearing base via the contact surface of the convex curved surface. At least either the inner circumference of the bearing housing or the outer circumference of the pad forms a curved surface extending along the axial direction, and a distance between the inner circumference of the bearing housing and the outer circumference of the pad gradually increases from the center towards the ends along the axial direction.

In the above aspect, at least either the inner circumference of the bearing housing or the outer circumference of the pad forms a curved surface extending along the axial direction, and a distance between the inner circumference and the outer circumference gradually increases from the center towards the ends along the axial direction. Thereby, where the rotating shaft is deformed like an arch with respect to its axis line by its own weight or vibration transmitted from the outside and displaced in a direction orthogonal to the axial direction, positions at which the pads are supported by the bearing housing gradually move along a curved surface of the rotating shaft along the axial direction. Thereby, it is possible to reliably follow the deformation of the rotating shaft. In other words, it is possible to prevent friction and an increase in temperature caused by partial concentration of stress on the pads as found conventionally and also to keep constantly bearing characteristics stable.

On the other hand, a contact surface between the outer circumference of the bearing housing and the inner circumference of the bearing base extends along the axial direction of the rotating shaft and is formed to be a convex curved surface protruding outward, and the bearing housing is slidably supported by the bearing base via the contact surface in the shape of the convex curved surface. Therefore, even where the rotating shaft is deformed like an arch with respect to its axis line, the bearing housing will slip on the bearing base via the contact surface which forms the curved surface. Thereby, no strain occurs between the bearing housing and the bearing base, and the bearing housing can be supported stably and slidably by the bearing base.

That is, where the rotating shaft is deformed like an arch with respect to its axis line, while the bearing housing slides against the bearing base, positions at which the pads are supported by the bearing housing gradually move along a curved surface of the rotating shaft along the axial direction. Thereby, no strain occurs between the pads, the bearing housing and the bearing base, and there is no partial concentration of stress on the pads. As a result, it is possible to support the rotating shaft stably by the pads.

Further, in the present invention, it is acceptable that the outer circumference of the pad is formed approximately flat along the axial direction and the inner circumference of the bearing housing is formed so as to be a convex curved surface protruding inward with respect to the axial direction of the rotating shaft.

In the above aspect, since the outer circumference of the pad is approximately flat along the axial direction, processing can be performed easily. Further, since existing pads can be used as they are, it is possible to lower production costs. That is, while production costs are lowered, the pads are allowed to reliably follow the deformation of the rotating shaft along its axis line as described above. As a result, it is possible to keep constantly bearing characteristics stable.

In the present invention, it is also acceptable that a flat surface approximately in parallel with the axial direction is formed at the center on the inner circumference of the bearing housing along the axial direction.

In the above aspect, where the rotating shaft is not deformed like an arch with respect to its axis line but kept normal, the rotating shaft can be stably supported from the outward radial direction by the pads in contact with a flat center on the inner circumference of the bearing housing along the axial direction. Further, where the rotating shaft is deformed like an arch with respect to its axis line, a distance between the inner circumference of the bearing housing and the outer circumference of the pad gradually increases from the center towards the ends along the axial direction as described previously. Therefore, positions at which the pads are supported by the bearing housing gradually move along a curved surface of the rotating shaft in the axial direction. Thereby, it is possible to reliably follow the deformation of the rotating shaft and keep constantly bearing characteristics stable.

Further, in the present invention, it is acceptable that supporting members for individually fixing the plurality of pads around the rotating shaft on the inner circumference of the bearing housing are provided, and the supporting member is mounted either at the end of the outer circumference of the pad in the axial direction or the side surface of the pad, thereby supporting and positioning the pad.

In the above aspect, either at the end of the outer circumference of the pad in the axial direction or on the side surface of the pad, a supporting member for supporting and positioning the pad is mounted. That is, at sites other than the proximity to the center along the axial direction where stress occurs on the bearing housing, the supporting member is used to support and position the pad with respect to the bearing housing. Thereby, while loads applied to the supporting member are reduced, the supporting member can be used to retain the pad on the bearing housing.

Further, in the present invention, it is acceptable that the supporting members for individually supporting the plurality of pads around the rotating shaft on the inner circumference of the bearing housing are provided, and the supporting member is arranged inside the pad so as to be along the axial direction of the rotating shaft and formed with a flexible material which can be deformed in a direction orthogonal to the axial direction.

In the above aspect, where the rotating shaft is deformed like an arch with respect to its axis line, positions at which the bearing housing supports the pads gradually move along a curved surface of the rotating shaft in its axial direction. Thereby, it is possible to prevent partial concentration of stress on the pads. Further, even where the pads are deformed, the supporting members sag following the deformation. Thereby, no strain occurs between the supporting members and the pads, thus making it possible to support the pads stably by the supporting members.

A rotary machine of the present invention is provided with the rotating shaft and the above-described bearing device for supporting the rotating shaft.

In the above aspect, the rotating shaft of the rotary machine such as a gas turbine, a compressor, or a supercharger is supported by the bearing device, by which the pads are allowed to reliably follow the deformation of the rotating shaft, preventing partial concentration of stress on the pads.

Thereby, it is possible to keep the bearing performance of the pads over a long time and lower the cost of maintaining the bearing inside the rotary machine.

Effects of the Invention

According to the present invention, where the rotating shaft is deformed like an arch with respect to its axis line by its own weight or vibration transmitted from the outside, while the bearing housing slides against the bearing base, positions at which the pads are supported by the bearing housing gradually move along a curved surface of the rotating shaft along its axial direction. Thereby, no strain occurs between the pads, the bearing housing and the bearing base, and there is no partial concentration of stress on the pads. Therefore, it is possible to support the rotating shaft stably by the pads. That is, the bearing housing and the pads are allowed to reliably follow the deformation of the rotating shaft. As a result, it is possible to prevent friction and an increase in temperature caused by partial concentration of stress on the pads as found conventionally and provide such an effect that it is possible to keep constantly bearing characteristics stable.

DESCRIPTION OF SYMBOLS

Figure 1:
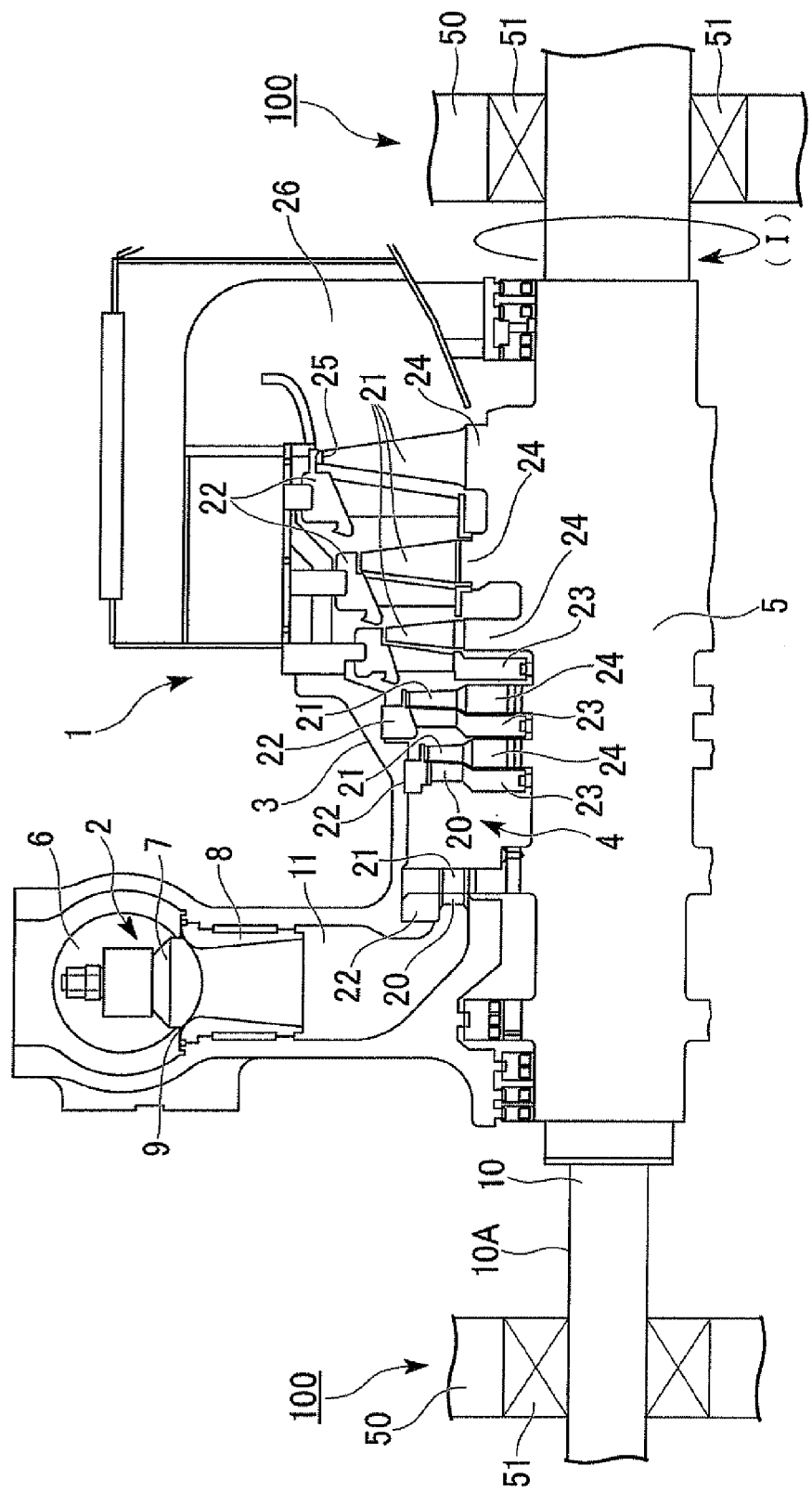
FIG. 1 is a front elevational view schematically showing a steam turbine to which the present invention is applied.

10: Rotating shaft (supported body)
10A: Outer circumference
50: Bearing base
50A: Inner circumference
51: Bearing housing
51A: Outer circumference
51B: Inner circumference
52: Pad
52A: Outer circumference
52B: Side surface
53: Contact surface
54: Accommodating portion
54A: Wall surface 56: Flat surface
60: Pivot (supporting member)
65: Rod (supporting member)
100, 101, 102, 103: Bearing device

BEST MODE FOR CARRYING OUT THE INVENTION

Embodiment 1

Figure 2:
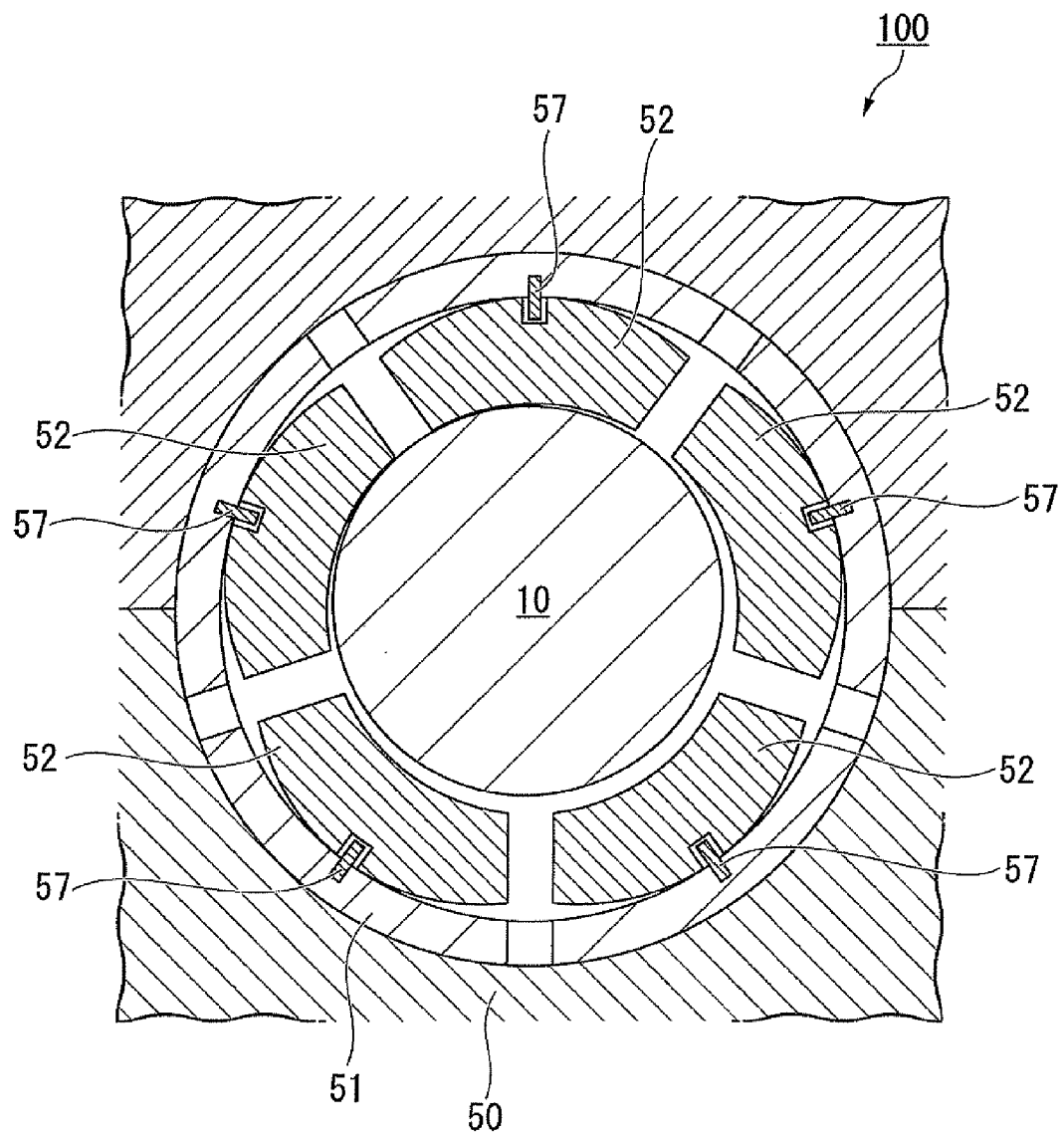
FIG. 2 is a cross sectional view of a journal bearing device shown as Embodiment 1 of the present invention which is perpendicular to a rotating shaft.
Figure 3:
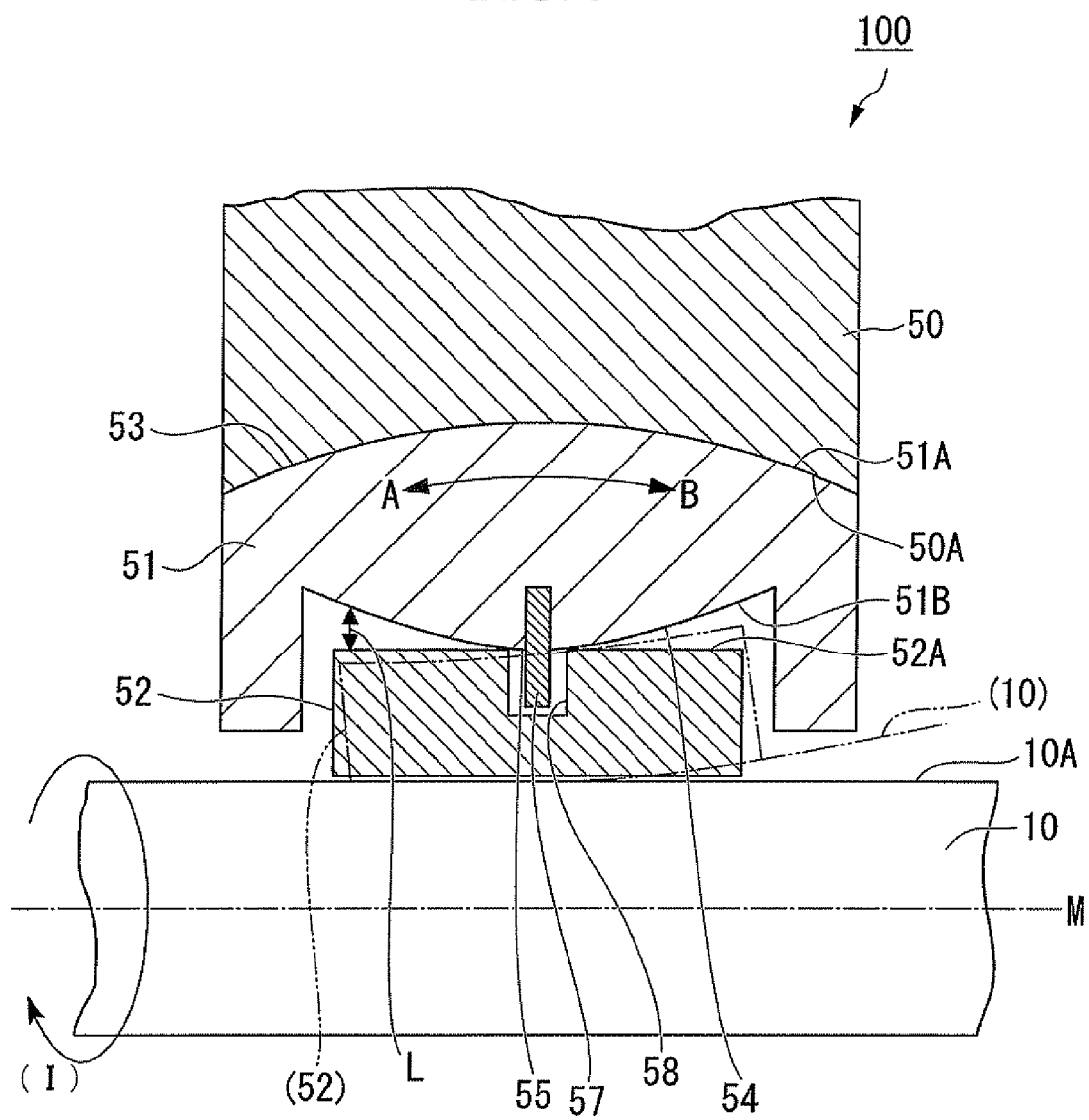
FIG. 3 is a cross sectional view of the journal bearing device shown as Embodiment 1 of the present invention when viewed laterally.

A description will be given of Embodiment 1 of the present invention on the basis of FIG. 1 to FIG. 3. FIG. 1 shows a steam turbine 1 as one example of a rotary machine on which a bearing device of the present embodiment is loaded. The steam turbine 1 is mainly provided with adjusting valves 2 for adjusting the quantity and pressure of steam (working fluid) flowing into the steam turbine 1, a casing 3 for keeping the pressure, a power generating portion 4 for generating power, and a rotor 5 for conveying the power to a machine such as a compressor.

The adjusting valves 2 are provided inside the casing 3 in a plurality of units, each of which has an adjusting valve chamber 6 into which steam flows from a boiler which is not illustrated, a valve body 7 and a valve seat 8. The valve seat 8 is formed approximately in a cylindrical shape, the axial center of which is orthogonal to the axial center of the rotor 5. Further, in the rotor 5, the rotating shaft 10 thereof is supported by a journal bearing device 100 (to be described later) and a thrust bearing device which is not illustrated.

The inner diameter of the valve seat 8 gradually expands in a direction towards the rotor 5 and the leading end thereof is communicatively connected to a steam chamber 11. The inner surface of the valve seat 8 at an end opposite the steam chamber 11 forms a curved surface 9 having an inwardly convex curvature. A lower part of the valve body 7 forms a part of a spherical body and is mounted so as to be in contact with and apart from the curved surface 9 of the valve seat 8. When the valve body 7 is apart from the valve seat 8, a steam flow channel is opened, and when in contact with the valve seat 8, the steam flow channel is closed. The adjusting valve 2 controls a quantity of steam flow by opening and closing the valve body 7. A plurality of adjusting valves 2 are adjusted for opening-closing timing, thereby controlling the power output of the steam turbine.

The steam chamber 11 is formed approximately in a doughnut shape, guiding steam flowing from the adjusting valve 2 into the power generating portion 4. The steam flow channel of the steam chamber 11 becomes narrower towards the inside and also deflects in a direction parallel with the axial center of the rotor 5.

The power generating portion 4 is provided with a nozzle 20 fixed to the casing 3 and a moving blade 21 attached to the rotor 5. One set of the nozzle 20 and the moving blade 21 is referred to as a stage, and the present embodiment has six stages. The nozzle 20 causes steam to expand inside a steam channel to generate velocity energy, thereby changing a direction of flow and acting to generate kinetic momentum in an axially rotating direction. The moving blade 21 absorbs energy of steam which has been converted to the velocity energy by the nozzle 20, thereby acting to convert the energy to rotating energy of the rotor 5.

A large number of the nozzles 20 are arranged in a radial manner and retained by a ring-shaped partition plate outer ring 22 and a ring-shaped partition plate inner ring 23 firmly fixed to the casing 3. Between the rotor 5-side end of the partition plate inner ring 23 and the rotor 5, there is provided a seal structure for preventing steam leakage. In a stage where steam pressure is high, a labyrinth seal structure is adopted.

A large number of the moving blades 21 are arranged in a radial manner and firmly attached to an outer circumferential part of a disk 24 mounted in a cylindrical shape so as to protrude from the rotor 5. At the leading end of a last-stage moving blade 21, a shroud 25 is attached, and at a site opposite the shroud 25 on the side of the partition plate outer ring 22, there is attached a fin for preventing steam leakage.

The rotor 5 is rotatably supported by a bearing device 100 (to be described later). The rotor 5 acts to convey power generated by the power generating portion 4 to a machine such as a compressor. Between the rotor 5 and the casing 3, there is mounted a seal structure for preventing leakage of steam and the like. Discharged steam which has activated the steam turbine 1 and completed work is sent through a discharge chamber 26 to a steam condenser which is not illustrated.

Next, a description will be given of a journal bearing device 100 assembled to the rotating shaft 10 of the rotor 5 with reference to FIG. 1 through FIG. 3. The journal bearing device 100 is provided with a bearing base 50, a bearing housing 51 and a plurality of pads 52. The bearing base 50 is fixed to a body (not illustrated) of the journal bearing device 100. The bearing housing 51 is supported by the bearing base 50, and the rotating shaft 10 which is a supported body penetrates at the center. The pads 52 are arranged around the rotating shaft 10 (in a direction indicated by the arrow (I)) inside the bearing housing 51, thereby rotatably supporting an outer circumference 10A of the rotating shaft 10. The bearing housing 51 functions as an oil tank into which lubricating oil is filled. The bearing housing 51 is formed in a cylindrical shape as a whole, fitted into and supported by the bearing base 50. Further, on an inner circumference side of the bearing housing 51, a plurality of pads 52 are arranged so as to circumferentially surround the rotating shaft 10 (indicated by the arrow (I)). In the present embodiment, an inner circumference of each pad 52 facing the rotating shaft 10 and an outer circumference on the other side are both formed in a curved shape so as to circumferentially surround the outer circumference of the rotating shaft 10. Further, the inner circumference and the outer circumference of each pad 52 are formed flat so as to be approximately in parallel with the axial direction of the rotating shaft 10. There is no particular restriction on the number of the pads 52. However, from a practical point of view, it is preferable that four to six pads are mounted. It should be noted that use of only two pads can provide a sufficient effect.

Regarding the bearing base 50 and the bearing housing 51, a contact surface 53 between an inner circumference 50A of the bearing base 50 and an outer circumference 51A of the bearing housing 51 is formed to give a convex curved surface protruding outward with respect to the axis line M of the rotating shaft 10, in other words, a curved surface protruding outward over the entire circumference of the axis around the axis line M. Thereby, the bearing housing 51 can be supported so as to slip on the bearing base 50. In other words, the bearing housing 51 is supported by the bearing base 50 slidably along the convex curved surface (slidably in a direction given by the arrow A-B).

Further, on the bearing housing 51, a recessed accommodating portion 54 into which the pads 52 are accommodated is formed annularly around the rotating shaft 10. Inside the accommodating portion 54, there is formed an inner circumference 51B which forms a curved surface extending along the axis line M and also supports the pads 52. The inner circumference 51B of the bearing housing 51 which forms the curved surface protrudes inward at the center thereof towards the rotating shaft 10. Thereby, a distance L between the inner circumference 51B of the bearing housing 51 and the outer circumference 52A of the pad 52 which is flat along the axis line M is formed so as to gradually increase from the center towards the ends along the axis line M. Further, as shown in FIG. 2 and FIG. 3, normally, a protruded center on the inner circumference 51B of the bearing housing 51 is in contact with the outer circumference 10A of the rotating shaft 10, thereby supporting the pads 52.

Further, a pivot 57 protrudes at the center of the bearing housing 51 in the direction of the axis line M so as to correspond to each of the pads 52. Further, on the outer circumference of the corresponding pad 52, there is provided a recess 58 with which the leading end of the pivot 57 is engaged. Then, the pad 52 is retained by the pivot 57 and the recess 58 so as to be positioned with respect to the bearing housing 51 around the axis line M and in the direction of the axis line M.

Figure 10:
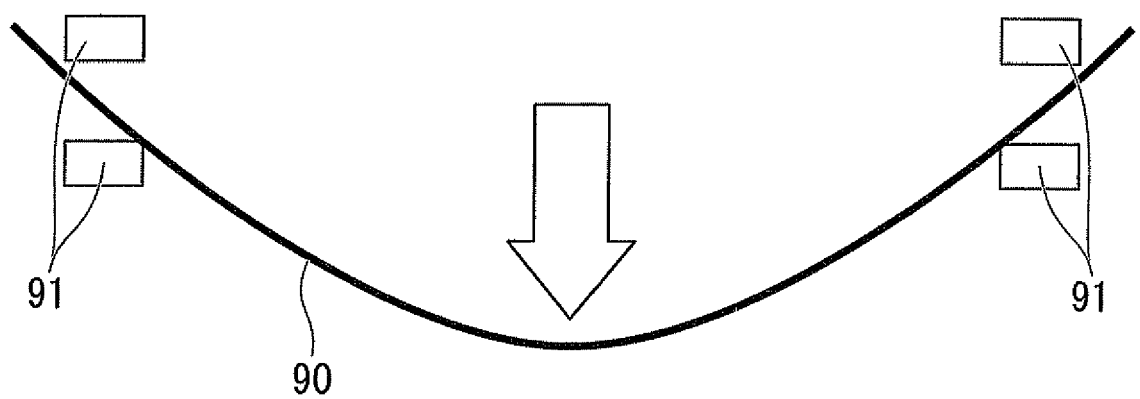
FIG. 10 is a schematic view for explaining problems of a conventional bearing device.

In the above-structured journal bearing device 100, the following actions and effects are provided. First, where the rotating shaft 10 is deformed like an arch with respect to the axis line M by its own weight or vibration transmitted from the outside and the rotating shaft 10 is displaced in a direction orthogonal to the axis line M (a phenomenon illustrated in FIG. 10), for example, the pads 52 are transformed as shown by the single dotted and dashed line. Thereby, positions 55 at which the pads 52 are supported by the bearing housing 51 gradually move along a curved surface of the rotating shaft 10 in the direction of the axis line M. Then, the pads 52 are able to reliably support the rotating shaft 10, following the deformation of the rotating shaft 10.

Further, the contact surface 53 between the outer circumference 51A of the bearing housing 51 and the inner circumference 50A of the bearing base 50 is a convex curved surface protruding outward with respect to the axis line M of the rotating shaft 10, and the bearing housing 51 is supported via the contact surface 53, which is a convex curved surface, by the bearing base 50 slidably (to slide freely in a direction indicated by the arrow A-B). Therefore, even where the rotating shaft 10 is deformed like an arch with respect to the axis line M, the bearing housing 51 will slip on the bearing base 50 via the contact surface 53 which forms a curved surface. Thereby, no strain occurs between the bearing housing 51 and the bearing base 50, and the bearing housing 51 can be supported stably and slidably by the bearing base 50. That is, where the rotating shaft 10 is deformed like an arch with respect to the axis line M, while the bearing housing 51 slides against the bearing base 50, positions at which the pads 52 are supported by the bearing housing 51 gradually move along a curved surface of the rotating shaft 10 along the axial direction. Thereby, no strain occurs between the pads 52, the bearing housing 51 and the bearing base 50, and there is no partial concentration of stress on the pads 52 either. Then, the rotating shaft 10 can be supported stably by the pads 52. As a result, it is possible to prevent friction and an increase in temperature caused by partial concentration of stress on the pads 52 as found conventionally and also keep constantly bearing characteristics stable.

Further, in the above-structured journal bearing device 100, the inner circumference 51B of the bearing housing 51 gives a curved surface extending along the axis line M, and a distance L between the inner circumference 51B of the bearing housing 51 and the outer circumference 52A of the pad 52 gradually increases from the center towards the ends along the axis line M. The outer circumference 52A of the pad 52 is formed approximately flat along the axis line M. Therefore, the pad 52 can be processed easily, with the above effects obtained. Still further, existing pads 52 can be used, as they are, to lower the production cost. That is, while the production cost is lowered, as described above, the pads 52 are allowed to reliably follow the deformation of the rotating shaft 10 along the axis line M. Thereby, it is possible to keep constantly bearing characteristics stable.

Figure 4:
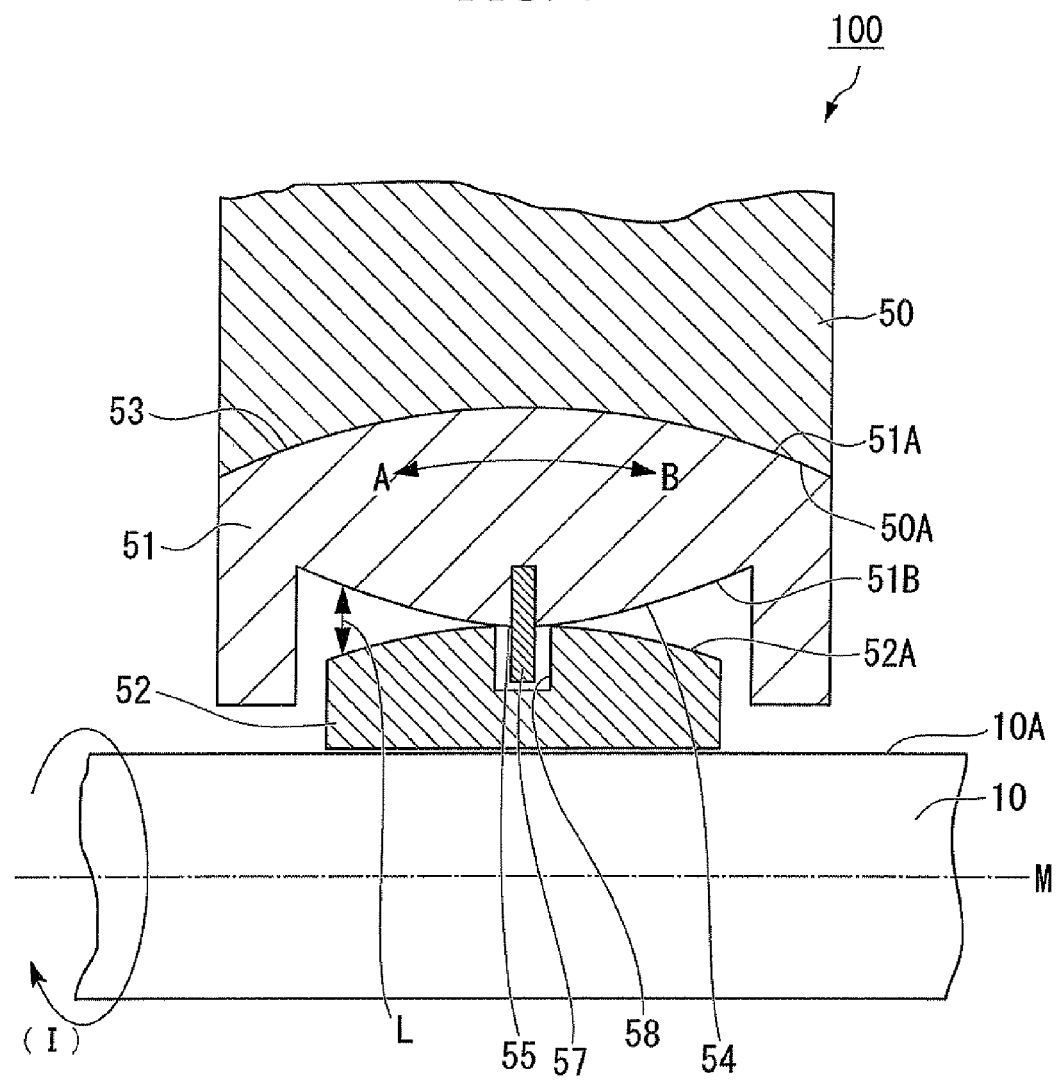
FIG. 4 is a cross sectional view of a journal bearing device shown as a modified example of FIG. 3 when viewed laterally.
Figure 5:
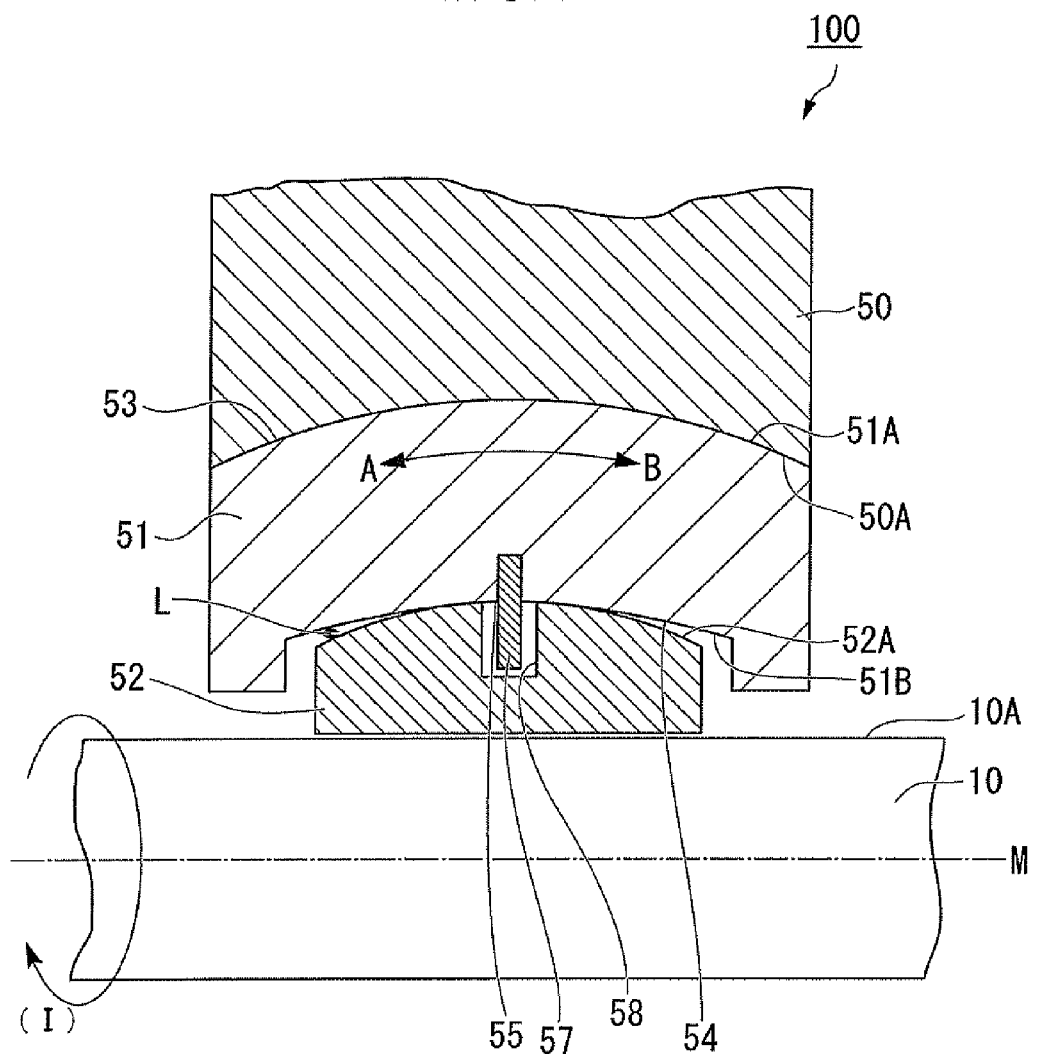
FIG. 5 is a cross sectional view of a journal bearing device shown as another modified example of FIG. 3 when viewed laterally.

It is noted that in the above embodiment, the inner circumference 51B of the bearing housing 51 gives a curved surface protruding inward along the axis line M. Further, the outer circumference 52A of the pad 52 gives a flat surface. Nevertheless, as shown in FIG. 4, it is acceptable that the outer circumference 52A of the pad 52 gives a curved surface protruding outward along the axis line M. It is also acceptable that, as shown in FIG. 5, the inner circumference 51B of the bearing housing 51 gives a curved surface protruding outward along the axis line M or the outer circumference 52A of the pad 52 gives a curved surface protruding outward along the axis line M. Then, in the examples shown in FIG. 4 and FIG. 5, a distance L between the inner circumference 51B of the bearing housing 51 and the outer circumference 52A of the pad 52 gradually increases from the center towards the ends along the axis line M. Therefore, as with the bearing device 100 shown in FIG. 2 and FIG. 3, where the rotating shaft 10 is deformed like an arch with respect to its axis line M by its own weight and vibration transmitted from the outside and the rotating shaft 10 is displaced in a direction orthogonal to the axis line M (a phenomenon shown in FIG. 10), positions 55 at which the pads 52 are supported by the bearing housing 51 gradually move along a curved surface of the rotating shaft 10 in the axial direction and follow the deformation of the rotating shaft 10. Thereby, the rotating shaft 10 can be reliably supported by the pads. As a result, it is possible to prevent friction and an increase in temperature caused by partial concentration of stress on the pads 52 as found conventionally and also keep constantly bearing characteristics stable.

Embodiment 2

Figure 6:
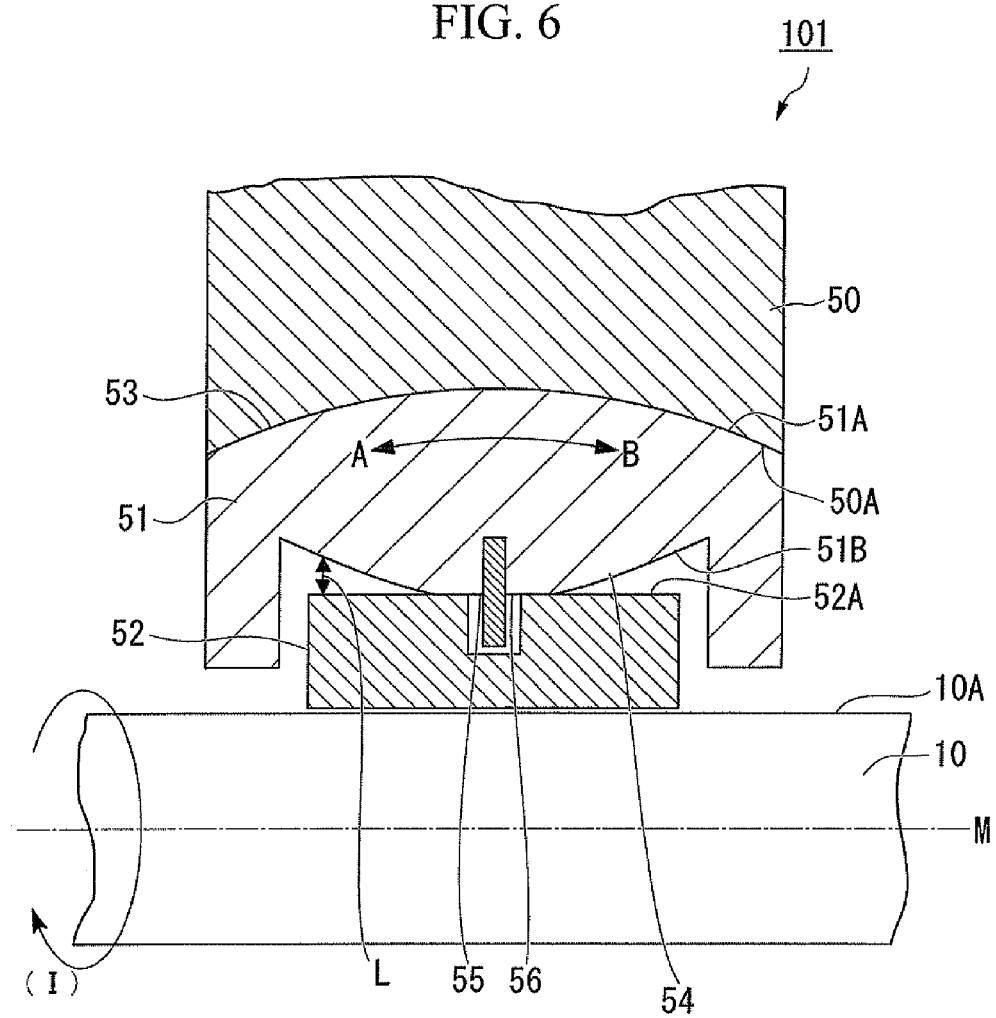
FIG. 6 is a cross sectional view of a journal bearing device shown as Embodiment 2 of the present invention when viewed laterally.

A description will be given of Embodiment 2 of the present invention with reference to FIG. 6. A journal bearing device 101 of the present embodiment is different from the journal bearing device 100 of Embodiment 1 in the shape of an inner circumference 51B of a bearing housing 51. That is, the inner circumference 51B of the bearing housing 51 is a curved surface extending along the axis line M, the center of the inner circumference 51B is in the shape of protruding inward to the rotating shaft 10 side, and the top of the protruding portion of the inner circumference 51B is formed on a flat surface 56 approximately in parallel with the axis line M.

Then, in the above-structured journal bearing device 101, where the rotating shaft 10 is not deformed like an arch with respect to its axis line M but kept normal, the rotating shaft 10 can be stably supported from the outward radial direction by the pads 52 in contact with the flat surface 56 at the center of the inner circumference 51B of the bearing housing 51. Further, where the rotating shaft 10 is deformed like an arch with respect to its axis line M, as with Embodiment 1, a distance between the inner circumference 51B of the bearing housing 51 and the outer circumference 52A of the pad 52 gradually increases from the center towards the ends along the axial direction. Therefore, positions 55 at which the pads 52 are supported by the bearing housing 51 gradually move along a curved surface of the rotating shaft 10 in the axial direction. Thereby, the deformation of the rotating shaft 10 is reliably followed and, as a result, it is possible to keep constantly bearing characteristics stable.

It is noted that, as shown in Embodiment 2, the flat surface 56 formed at the top of the inner circumference 51B of the bearing housing 51 and approximately in parallel with the axis line M may be applied to a journal bearing device structured as shown in FIG. 4 or FIG. 5.

Embodiment 3

Figure 7:
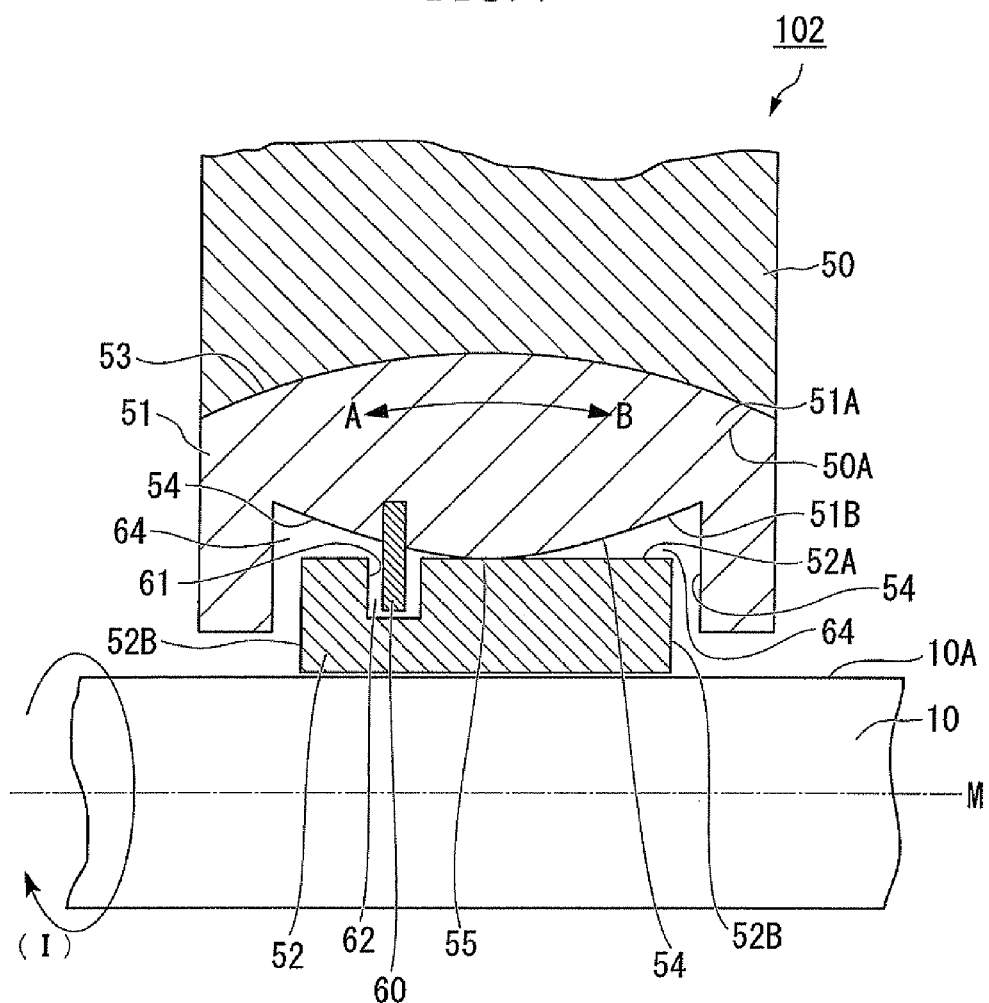
FIG. 7 is a cross sectional view of a journal bearing device shown as Embodiment 3 of the present invention when viewed laterally.
Figure 8:
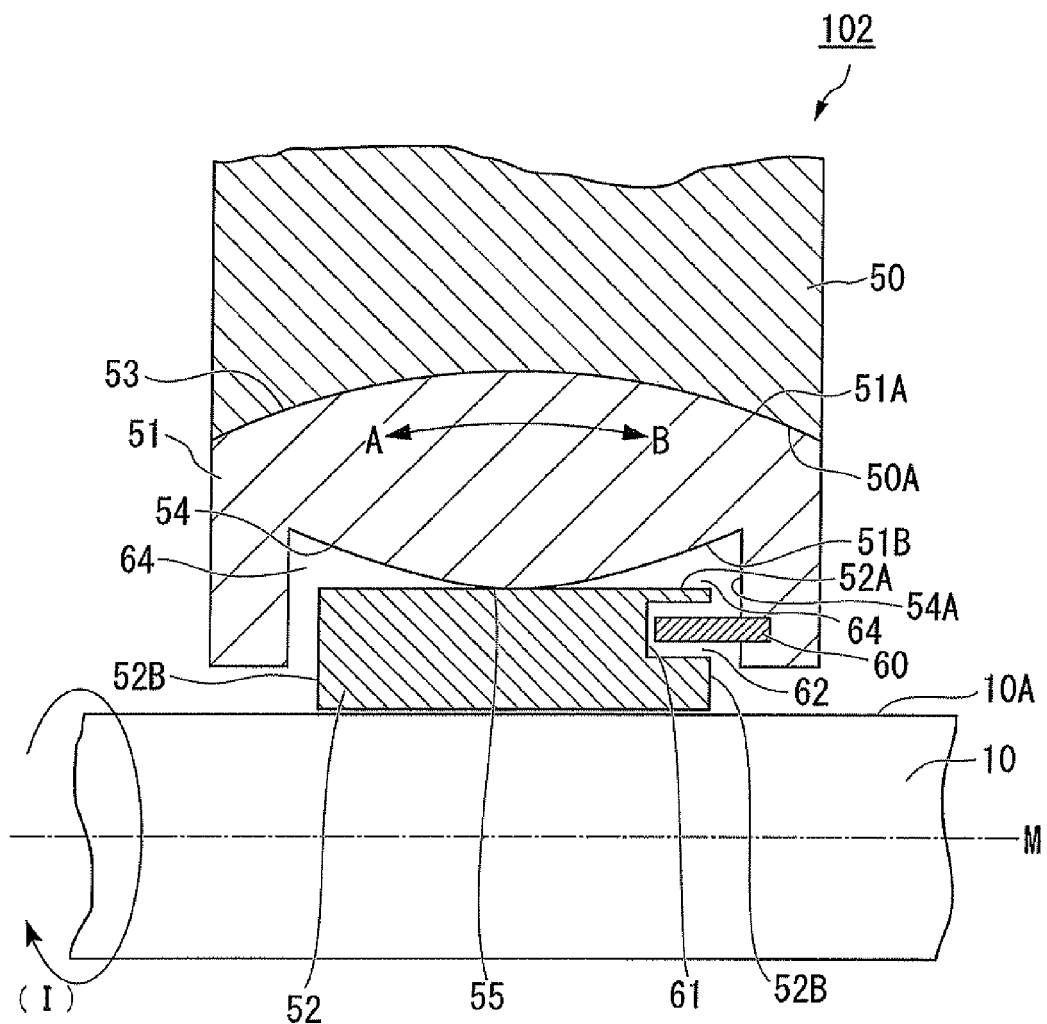
FIG. 8 is a cross sectional view of a journal bearing device shown as a modified example of FIG. 7 when viewed laterally.

A description will be given of Embodiment 3 of the present invention with reference to FIG. 7 and FIG. 8. A journal bearing device 102 of the present embodiment is, as shown in FIG. 7, different from the journal bearing device 100 of the Embodiment 1 in a position of a pivot 60 which is a supporting member for supporting the pad 52 on the bearing housing 51. The pivot 60 is arranged in such a manner that the base end thereof is fixed to the end of the inner circumference 51B of the bearing housing 51 in the axial direction and the leading end protrudes from the inner circumference 51B and also the leading end thereof is inserted into a recess 61 formed on an opposite outer circumference 52A of the pad 52. Then, the above-described pivot 60 is engaged with the recess 61, by which the pad 52 is positioned with respect to the bearing housing 51 in the axial direction and around the axial direction (a direction indicated by the arrow (I)). Further, a clearance 62 is formed between the pivot 60 inserted into the recess 61 and the recess 61, and the pad 52 is able to move freely with respect to the bearing housing 51 only by the clearance 62. Thereby, the pad 52 is allowed to follow the deformation and displacement of the rotating shaft 10. Still further, the pivot 60 and the recess 61 which is engaged with the pivot 60 are formed respectively on the inner circumference 51B of the bearing housing 51 having an interval 64 and at an end of the outer circumference 52A of the pad 52. That is, at sites other than the vicinity of the center along the axis line M where stress occurs on the bearing housing 51, the pivot 60 and the recess 61 which is engaged with the pivot 60 are mounted.

As described above, in the journal bearing device 102 of Embodiment 3, the pivot 60 is mounted on a site which is at an end of the outer circumference 52A of the pad 52 in the axial direction and other than the vicinity of the center along the axis line M where stress occurs on the bearing housing 51. Further, the pivot 60 is used to support and position the pad 52 with respect to the bearing housing 51. Thereby, it is possible to retain and position the pad 52 with respect to the bearing housing 51 by the pivot 60, while reducing loads applied to the pivot 60.

It is noted that in the present embodiment, the pivot 60 for retaining and positioning each of the pads 52 is provided on the inner circumference 51B of the bearing housing 51. Nevertheless, it is acceptable that the pivot 60 is mounted at an end of the outer circumference 52A of the pad 52 along the axis line M and the recess 61 which is engaged with the pivot 60 is mounted on the inner circumference 51B of the bearing housing 51. Alternatively, it is also acceptable that pivots 60 are mounted at both ends so as to give a pair. Further, in the above embodiment, the pivot 60 is mounted on the inner circumference 51B of the bearing housing 51 and the recess 61 is mounted on the outer circumference 52A of the pad 52. Nevertheless, for example, as shown in FIG. 8, it is acceptable that they are mounted respectively on the wall surface 54A of the accommodating portion 54 arranged in a recessed manner so as to accommodate the pad 52 and on the side surface 52B of the pad 52. In this instance, it is appropriately selected whether the pivot 60 or the recess 61 is arranged on the wall surface 54A of the accommodating portion 54 or the side surface 52B of the pad 52.

Embodiment 4

Figure 9:
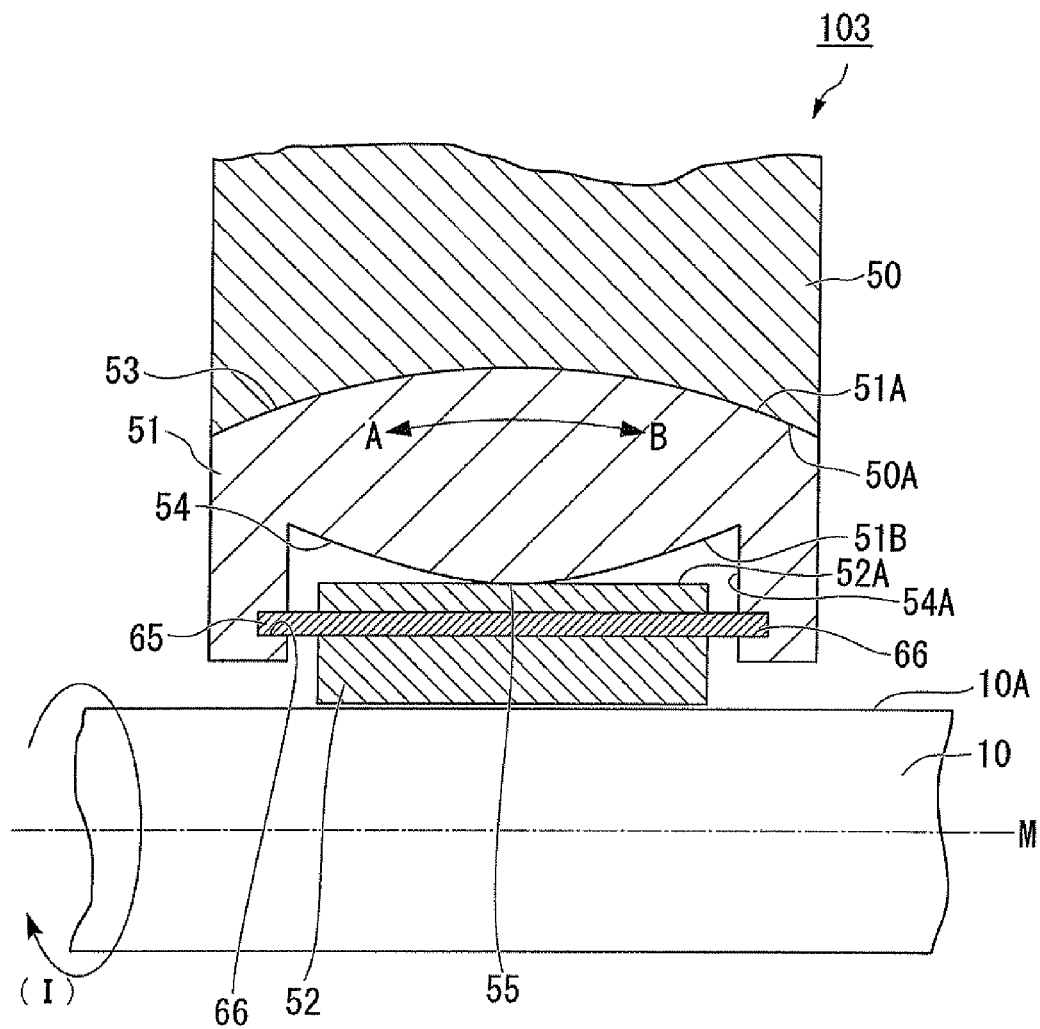
FIG. 9 is a cross sectional view of a journal bearing device shown as Embodiment 4 of the present invention when viewed laterally.

A description will be given of Embodiment 4 of the present invention with reference to FIG. 9. A journal bearing device 103 of the present embodiment is different from the journal bearing device 102 of Embodiment 3 in an aspect of a supporting member. That is, Embodiment 4 is characterized in that the supporting member for retaining and positioning the pad 52 with respect to the inner circumference 51B of the bearing housing 51 is formed with a flexible rod 65. The rod 65 is arranged along the axis line M of the rotating shaft 10 so as to penetrate through the pad 52, and an end thereof is engaged within a recess 66 formed on the wall surface 54A of the accommodating portion 54. Where the rotating shaft 10 is deformed like an arch with respect to its axis line M, the rod 65 is deformed in a direction orthogonal to the axis line M, following the deformation.

In the journal bearing device 103 of Embodiment 4, even where the pad 52 is deformed similarly according to deformation of the rotating shaft 10 like an arch with respect to its axis line M, the rod 65 which is a supporting member will sag, following the deformation. Thereby, no stress is concentrated between the rod 65 and the pad 52 and such an effect is obtained that the pad 52 can be supported stably by the rod 65.

It is noted that in Embodiment 4, the rod 65 is mounted so as to penetrate through the pad 52 along the axial direction of the rotating shaft 10. Nevertheless, it is acceptable that a rod 65 which is not allowed to penetrate through the pad 52 but divided is mounted only in the vicinity of the wall surface 54A of the accommodating portion 54, thereby supporting and positioning the pad 52 with respect to the bearing housing 51. Further, it is also acceptable that the supporting member shown in Embodiment 3 and Embodiment 4 is applied to a journal bearing device structured as shown in FIG. 4 and FIG. 5.

Further, the above-described Embodiment 1 to Embodiment 4 have referred to an application to the steam turbine 1 which is one example of rotary machines. Nevertheless, it is acceptable the above-described journal bearing devices 100, 101, 102, 103 are assembled into a rotary machine such as a compressor and a supercharger other than the steam turbine 1. Then, in the rotary machine such as a compressor and a supercharger as well, it is possible to prevent friction and an increase in temperature caused by partial concentration of stress on the pad 52 and also to keep constantly bearing characteristics stable. As a result, rotary machines such as a gas turbine, a compressor and a supercharger are extended in the operating life of bearings, thus making it possible to lower the cost of maintaining bearing parts of these rotary machines.

As described so far, a detailed description has been given of embodiments of the present invention with reference to the drawings. A specific constitution shall not be limited to these embodiments but includes any change in design within the scope not departing from the gist of the present invention.

INDUSTRIAL APPLICABILITY

The present invention relates to a bearing device having a bearing housing which is supported by a bearing base mounted on a body of a rotary machine equipped with a rotating shaft and through which the rotating shaft penetrates at the center and a plurality of pads which are arranged inside the bearing housing so as to circumferentially surround the rotating shaft and rotatably support the rotating shaft, and the bearing device in which a contact surface between an outer circumference of the bearing housing and an inner circumference of the bearing base extends along the axial direction of the rotating shaft and forms a convex curved surface protruding outward, the bearing housing is slidably supported by the bearing base via the contact surface of the convex curved surface, at least either the inner circumference of the bearing housing or the outer circumference of the pad forms a curved surface extending along the axial direction, and a distance between the inner circumference of the bearing housing and the outer circumference of the pad gradually increases from the center towards the ends along the axial direction.

According to the present invention, there are provided such effects that it is possible to prevent friction and an increase in temperature caused by partial concentration of stress on the pads and keep constantly bearing characteristics stable.

The invention claimed is:

1. A bearing device comprising: a bearing housing which is supported by a bearing base mounted on a body of a rotary machine equipped with a rotating shaft and through which the rotating shaft penetrates at the center; and a plurality of pads which are arranged inside the bearing housing so as to circumferentially surround the rotating shaft and rotatably support the rotating shaft, wherein a contact surface between an outer circumference of the bearing housing and an inner circumference of the bearing base extends along the axial direction of the rotating shaft and forms a convex curved surface protruding outward, the bearing housing is slidably supported by the bearing base via the contact surface of the convex curved surface, at least either the inner circumference of the bearing housing or the outer circumference of the pad forms a curved surface extending along the axial direction, and a distance between the inner circumference of the bearing housing and the outer circumference of the pad gradually increases from the center towards the ends along the axial direction.

2. The bearing device according to claim 1, wherein the outer circumference of the pad is formed approximately flat along the axial direction and the inner circumference of the bearing housing is formed so as to be a convex curved surface protruding inward with respect to the axial direction of the rotating shaft.

3. A rotary machine comprising a rotating shaft; and the bearing device according to claim 2 for supporting the rotating shaft.

4. The bearing device according to claim 1, wherein a flat surface approximately in parallel with the axial direction is formed at the center of the inner circumference of the bearing housing along the axial direction.

5. A rotary machine comprising a rotating shaft; and the bearing device according to claim 4 for supporting the rotating shaft.

6. The bearing device according to of claim 1, further comprising supporting members for individually fixing the plurality of pads around the rotating shaft on the inner circumference of the bearing housing, wherein the supporting member is mounted either at an end of the outer circumference of the pad in the axial direction or on the side surface of the pad, thereby supporting and positioning the pad.

7. A rotary machine comprising a rotating shaft; and the bearing device according to claim 6 for supporting the rotating shaft.

8. The bearing device according to claim 1, further comprising supporting members for individually supporting the plurality of pads around the rotating shaft on the inner circumference of the bearing housing, wherein the supporting member is arranged inside the pad so as to be along the axial direction of the rotating shaft and formed with a flexible material which can be deformed in a direction orthogonal to the axial direction.

9. A rotary machine comprising a rotating shaft; and the bearing device according to claim 8 for supporting the rotating shaft.

10. A rotary machine comprising a rotating shaft; and the bearing device according to claim 1 for supporting the rotating shaft.

* * * * *